United States Patent
Ihira

(10) Patent No.: US 9,399,831 B2
(45) Date of Patent: Jul. 26, 2016

(54) SEWING MACHINE AND NON-TRANSITORY COMPUTER- READABLE MEDIUM STORING SEWING MACHINE CONTROL PROGRAM

(71) Applicant: BROTHER KOGYO KABUSHIKI KAISHA, Nagoya-shi, Aichi-ken (JP)

(72) Inventor: Yuki Ihira, Kakamigahara (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 26 days.

(21) Appl. No.: 14/606,400

(22) Filed: Jan. 27, 2015

(65) Prior Publication Data

US 2015/0225882 A1 Aug. 13, 2015

(30) Foreign Application Priority Data

Feb. 10, 2014 (JP) .................................. 2014-023067

(51) Int. Cl.
| | | |
|---|---|---|
| *D05B 19/04* | (2006.01) | |
| *D05B 19/12* | (2006.01) | |
| *D05B 39/00* | (2006.01) | |
| *D05C 9/04* | (2006.01) | |

(52) U.S. Cl.
CPC ............... *D05B 19/04* (2013.01); *D05B 19/12* (2013.01); *D05B 39/00* (2013.01); *D05C 9/04* (2013.01); *G05B 2219/2626* (2013.01)

(58) Field of Classification Search
CPC ........ D05B 19/04; D05B 19/12; D05B 19/08; D05B 19/10; D05B 19/16; D05B 21/00; D05B 39/00; D05C 9/04; G05B 2219/2626; G05B 2219/45195; G05B 2219/45196; G05B 19/10; G05B 19/12; G05B 19/409
See application file for complete search history.

(56) References Cited

U.S. PATENT DOCUMENTS

| | | | | |
|---|---|---|---|---|
| 5,784,986 A | * | 7/1998 | Morita | .................. G05B 19/408 112/102.5 |
| 5,987,789 A | * | 11/1999 | Lubina | .................... A47B 97/04 38/102.1 |
| 2004/0133296 A1 | * | 7/2004 | Tomita | ............... G06Q 30/0601 700/138 |
| 2004/0221780 A1 | * | 11/2004 | Kawaguchi | ............ D05B 21/00 112/102.5 |
| 2006/0224271 A1 | | 10/2006 | Yoshimura et al. | |
| 2009/0188413 A1 | * | 7/2009 | Hirata | .................... D05B 19/10 112/103 |
| 2010/0206204 A1 | * | 8/2010 | Shimizu | ................. D05B 39/00 112/102.5 |

(Continued)

FOREIGN PATENT DOCUMENTS

| | | |
|---|---|---|
| JP | H09-164282 A | 6/1997 |
| JP | 2002-233677 A | 8/2002 |

(Continued)

*Primary Examiner* — Ismael Izaguirre
(74) *Attorney, Agent, or Firm* — Oliff PLC

(57) ABSTRACT

A sewing machine includes a carriage, a storage portion, a display portion, and a control device. A plurality of types of an embroidery frame is configured to be removably mounted on the carriage. The embroidery frame is capable of holding a work cloth. The carriage is capable of moving the embroidery frame parallel to two intersecting axes. The storage portion is configured to store a plurality of sizes of the work cloth that respectively correspond to the plurality of types of the embroidery frame. The display portion is configured to display information relating to at least sewing. The control device is configured to read, from the storage portion, the sizes of the work cloth that respectively correspond to the types of the embroidery frame. The control device is also configured to cause the display portion to display the sizes of the work cloth that have been read.

10 Claims, 13 Drawing Sheets

(56) References Cited

U.S. PATENT DOCUMENTS

| | | | | |
|---|---|---|---|---|
| 2011/0088606 A1* | 4/2011 | Kawaguchi | ............ | D05B 19/04 112/470.04 |
| 2011/0202165 A1* | 8/2011 | Tokura | ................ | D05C 5/06 700/138 |
| 2011/0226171 A1* | 9/2011 | Tokura | ................ | D05B 19/10 112/470.05 |
| 2013/0233219 A1* | 9/2013 | Nakamura | ............ | D05C 5/02 112/470.06 |

FOREIGN PATENT DOCUMENTS

| JP | 2002-346254 A | 12/2002 |
|---|---|---|
| JP | 2006-271597 A | 10/2006 |

\* cited by examiner

FIG. 6

| FRAME TYPE | SEWING-ENABLED AREA EA SIZE (E1×E2) | CLOTH SIZE (G1×G2) |
|---|---|---|
| EMBROIDERY FRAME (SMALL) | 60MM × 40MM | 180MM × 120MM |
| EMBROIDERY FRAME (MEDIUM) | 100MM × 100MM | 220MM × 180MM |
| EMBROIDERY FRAME (LARGE) | 180MM × 130MM | 300MM × 210MM |
| EMBROIDERY FRAME (EXTRA LARGE) | 360MM × 200MM | 480MM × 280MM |
| QUILTING FRAME | 200MM × 200MM | 320MM × 280MM |
| CLAMPING FRAME | 300MM × 100MM | 420MM × 180MM |
| JUMBO FRAME | 360MM × 360MM | 480MM × 440MM |
| ROUND FRAME 1 | 100 MM DIAMETER | 180MM × 180MM |
| ROUND FRAME 2 | 130 MM DIAMETER | 210MM × 210MM |
| ROUND FRAME 3 | 160 MM DIAMETER | 240MM × 240MM |

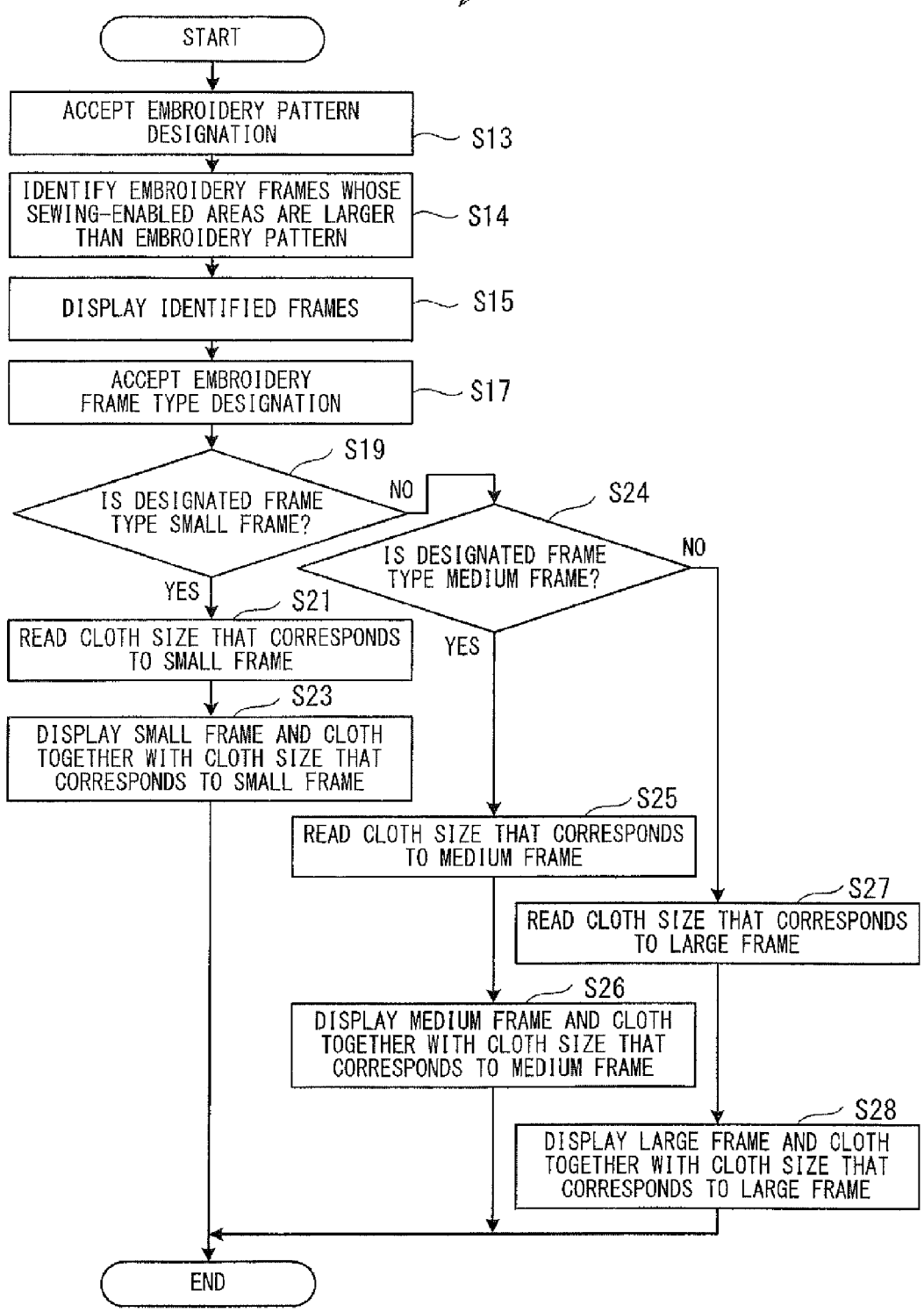

SEWING MACHINE AND NON-TRANSITORY COMPUTER-READABLE MEDIUM STORING SEWING MACHINE CONTROL PROGRAM

CROSS-REFERENCE TO RELATED APPLICATION

This application claims priority to Japanese Patent Application No. 2014-023067, filed on Feb. 10, 2014, the content of which is hereby incorporated by reference.

BACKGROUND

The present disclosure relates to a sewing machine that is capable of sewing an embroidery pattern, and to a non-transitory computer-readable medium that stores a sewing machine control program.

Sewing machines are known that are capable of sewing embroidery patterns. For example, a sewing machine is known that displays on a display an embroidery frame that can be used for sewing an embroidery pattern that has been selected by a user. Specifically, the sewing machine is provided with three types of embroidery frames of different sizes. From among the three types of embroidery frames of different sizes, the sewing machine displays on the display an embroidery frame that can be used for sewing the embroidery pattern that has been selected by the user. The displaying on the display of the embroidery frame that can be used makes it possible for the user to know which of the embroidery frames is appropriate for sewing the embroidery pattern.

SUMMARY

In a case where the user knows the embroidery frame that can be used for sewing the embroidery pattern, the user must cut a work cloth to a size that is suited to the size of the embroidery frame that will be used. At this time, if the work cloth that has been cut is too large for the size of the embroidery frame, the outer edges of the work cloth may extend significantly beyond the outer side of the embroidery frame in some cases, interfering with the embroidery sewing. On the other hand, if the work cloth that has been cut is too small for the size of the embroidery frame, cases may occur in which the embroidery frame is unable to hold the work cloth reliably.

Various embodiments of the broad principles derived herein provide a sewing machine in which these issues have been taken into consideration, such that the sewing machine makes it possible for the user to know the work cloth size that is appropriate for the embroidery frame, and also provides a non-transitory computer-readable medium that stores a sewing machine control program.

Various embodiments provide a sewing machine that includes a carriage, a storage portion, a display portion, and a control device. A plurality of types of an embroidery frame can be removably mounted on the carriage. The embroidery frame can hold a work cloth. The carriage can move the embroidery frame parallel to two intersecting axes. The storage portion is configured to store a plurality of sizes of the work cloth that respectively correspond to the plurality of types of the embroidery frame. The display portion is configured to display information relating to at least sewing. The control device is configured to read, from the storage portion, the sizes of the work cloth that respectively correspond to the types of the embroidery frame and to cause the display portion to display the sizes of the work cloth that have been read.

Embodiments also provide a non-transitory computer-readable medium which stores the sewing machine control program. When the sewing machine control program is executed on the sewing machine that includes a display portion and a storage portion in which are stored a plurality of sizes of a work cloth that respectively correspond to a plurality of types of an embroidery frame, the sewing machine control program causes the sewing machine to perform the steps of reading, from the storage portion, the sizes of the work cloth that respectively correspond to the types of the embroidery frame, and displaying, on the display portion, the sizes of the work cloth that have been read.

BRIEF DESCRIPTION OF THE DRAWINGS

Embodiments will be described below in detail with reference to the accompanying drawings in which:

FIG. 6 is a table that shows a dimension data table 230;

FIG. 7 is a flowchart that shows processing of a frame selection program 211 in a first embodiment;

DETAILED DESCRIPTION

Hereinafter, embodiments of a sewing machine 301 that reduces the present disclosure to practice will be explained with reference to the drawings. Note that the drawings are used for explaining technological features that the present disclosure can utilize and do not serve to restrict the content of the present disclosure.

Overall Configuration of Sewing Machine 301

Figure 1:
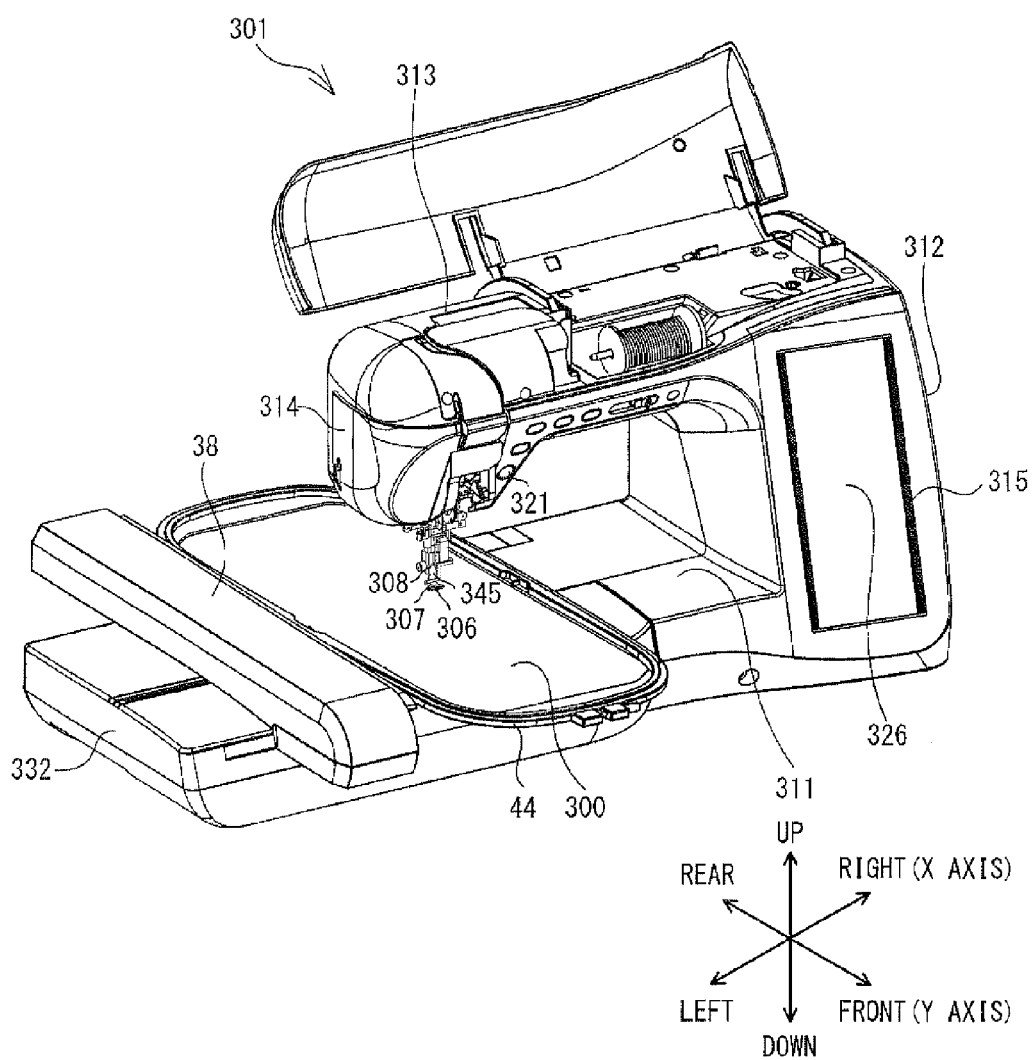
FIG. 1 is an oblique view of an entire sewing machine 301.

The overall configuration of the sewing machine 301 will be explained with reference to FIG. 1. The top side, the bottom side, the lower right side, the upper left side, the upper right side, and the lower left side in FIG. 1 respectively correspond to the top side, the bottom side, the front side, the rear side, the right side, and the left side of the sewing machine 301. The sewing machine 301 is provided with a bed 311, a pillar 312, an arm 313, and a head 314. The bed 311 is the base portion of the sewing machine 301. The pillar 312 extends upward from the right end of the bed 311. The arm 313 extends to the left from the upper end of the pillar 312, such that it is opposite the bed 311. An embroidery frame moving device 332 that will be described later is mounted on the bed 311.

A needle bar 308 and a presser bar 345 are provided on the bottom end of the head 314. The sewing needle 307 is affixed to the bottom end of the needle bar 308. A needle bar up-anddown moving mechanism (not shown in the drawings) is provided inside the head 314. The needle bar up-and-down moving mechanism is driven by the turning of a sewing machine motor 79 (refer to FIG. 5). The needle bar 308 is driven by the needle bar up-and-down moving mechanism such that it moves reciprocally upward and downward. A presser foot 306 is mounted on the bottom end of the presser bar 345. The presser foot 306 presses down on a work cloth 300. A needle plate (not shown in the drawings) is provided in the top face of the bed 311 in a position that is opposite the needle bar 308. A hole through which the sewing needle 307 can be inserted is provided in the needle plate. A shuttle mechanism (not shown in the drawings) is provided underneath the needle plate in the interior of the bed 311. The shuttle mechanism contains a lower thread bobbin (not shown in the drawings) and forms stitches by operating in coordination with the sewing needle 307.

In a case where the sewing machine 301 will sew an embroidery pattern, a user causes an embroidery frame 44 to hold the work cloth 300, then mounts the embroidery frame 44 on a carriage 30 of the embroidery frame moving device 332. The embroidery frame 44 is disposed on the bed 311 and on the top side of a body portion 11 of the embroidery frame moving device 332. As will be described in detail later, the embroidery frame moving device 332 moves the embroidery frame 44 that is mounted on the carriage 30 to the left and the right (parallel to an X axis) and toward the front and the rear (parallel to a Y axis). The embroidery frame 44 of the present embodiment has a known configuration that holds the work cloth 300 by clamping it between an inner frame 92 and an outer frame 91. Note that, in addition to the embroidery frame 44, a plurality of types of embroidery frames of different sizes and shapes can be mounted on the sewing machine 301, although they are not shown in the drawings.

The embroidery frame moving device 332 is provided with a carriage cover 38 that extends from the front to the rear. The carriage cover 38 is provided on the top side of the body portion 11 of the embroidery frame moving device 332 (refer to FIG. 2).

A liquid crystal display (LCD) 315 is provided on the front face of the pillar 312. The LCD 315 has a rectangular shape, with its long axis extending from the top to the bottom. The LCD 315 displays various types of items, such as a plurality of types of patterns, names of commands for executing various types of functions, various types of messages, and the like. A transparent touch panel 326 is provided on the front face of the LCD 315. The user can select a pattern to be sewn or a command to be executed by using a finger or a special touch pen to touch a position on the touch panel 326 that corresponds to an item that is displayed on the LCD 315.

A sewing start-and-stop switch 321 is provided in the lower portion of the front face of the arm 313. The sewing start-and-stop switch 321 starts and stops sewing by the sewing machine 301. When the sewing start-and-stop switch 321 is pressed, the sewing machine 301 issues a command to a control portion 60 (refer to FIG. 5) to start or stop sewing.

Embroidery Frame Moving Device 332

Figure 2:
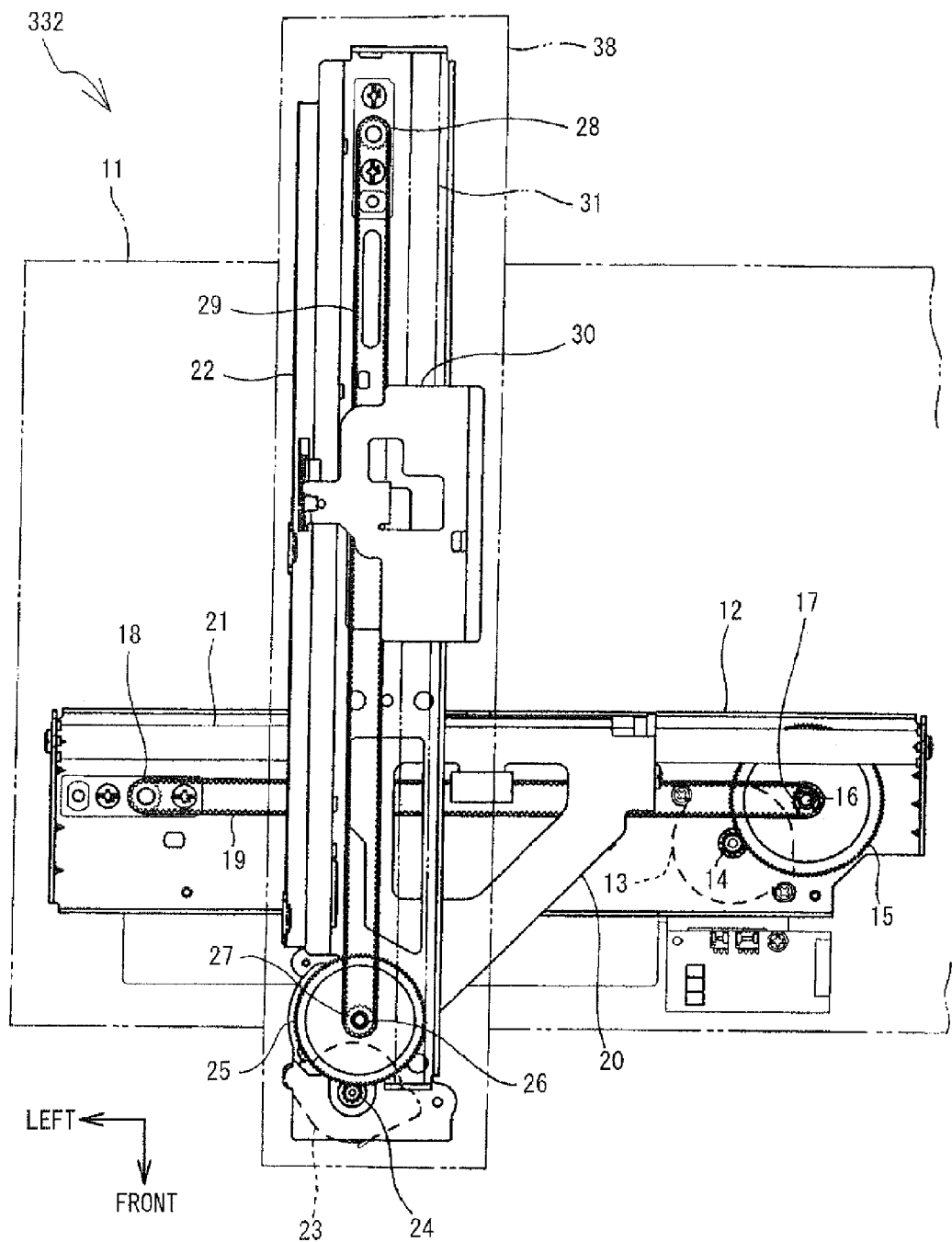
FIG. 2 is a plan view that shows an internal configuration of an embroidery frame moving device 332.

The internal configuration of the embroidery frame moving device 332 will be explained with reference to FIG. 2. A main frame 12 that extends from left to right is fixed in place inside the body portion 11 of the embroidery frame moving device 332. An X axis motor 13 is affixed to the right end portion of the main frame 12. A small-diameter drive gear 14 is affixed to the rotating shaft of the X axis motor 13. A large-diameter driven gear 15 meshes with the drive gear 14. The driven gear 15 is supported by a shaft 16 that is affixed to the main frame 12, such that the driven gear 15 can rotate. An X pulley 17 is formed in the top portion of the driven gear 15. The driven gear 15 and the X pulley 17 rotate as a single unit.

An X pulley 18 is supported by the left end portion of the main frame 12 such that the X pulley 18 can rotate. A ring-shaped X timing belt 19 is suspended around the X pulley 17 and the X pulley 18 such that it extends from left to right. The two straight line portions of the X timing belt 19 that extend between the X pulleys 17, 18 are disposed such that one is in front of the other and they are substantially parallel, although this is not shown in detail in the drawings. Of the two straight line portions of the X timing belt 19, the portion that is approximately in the center of the belt on the rear side is coupled to a coupling portion of a substantially triangular X frame 20. The X frame 20 is supported by an X guide bar 21 that extends from left to right (parallel to the X axis), such that the X frame 20 can move to the left and the right (parallel to the X axis). The left and right ends of the X guide bar 21 are both affixed to the main frame 12. When the X timing belt 19 rotates based on the driving of the X axis motor 13, the X frame 20 moves to the left and the right (parallel to the X axis) along the X guide bar 21.

A Y frame 22 that extends from the front to the rear is affixed to the X frame 20. A Y axis motor 23 is affixed to the front end of the Y frame 22. A small-diameter drive gear 24 is affixed to the rotating shaft of the Y axis motor 23. A large-diameter driven gear 25 meshes with the drive gear 24. The driven gear 25 is supported by a shaft 26 that is affixed to the Y frame 22, such that the driven gear 25 can rotate. A Y pulley 27 is formed in the top portion of the driven gear 25. The driven gear 25 and the Y pulley 27 rotate as a single unit.

A Y pulley 28 is supported by the rear end portion of the Y frame 22 such that the Y pulley 28 can rotate. A ring-shaped Y timing belt 29 is suspended around the Y pulley 27 and the Y pulley 28 such that it extends from front to rear. The two straight line portions of the Y timing belt 29 that extend between the Y pulleys 27, 28 are disposed such that one is to the left of the other and they are substantially parallel, although this is not shown in detail in the drawings. Of the two straight line portions of the Y timing belt 29, the portion that is approximately in the center of the belt on the right side is coupled to a coupling portion of the carriage 30. The carriage 30 is supported by a Y guide bar 31 that extends from the front to the rear (parallel to the Y axis), such that the carriage 30 can move to the front and the rear (parallel to the Y axis). The front and rear ends of the Y guide bar 31 are both affixed to the Y frame 22. When the Y timing belt 29 rotates based on the driving of the Y axis motor 23, the carriage 30 moves to the front and the rear (parallel to the Y axis) along the Y guide bar 31. The configuration that is described above makes it possible for the carriage 30 to move the embroidery frame 44 in two intersecting directions.

Carriage 30

Figure 3:
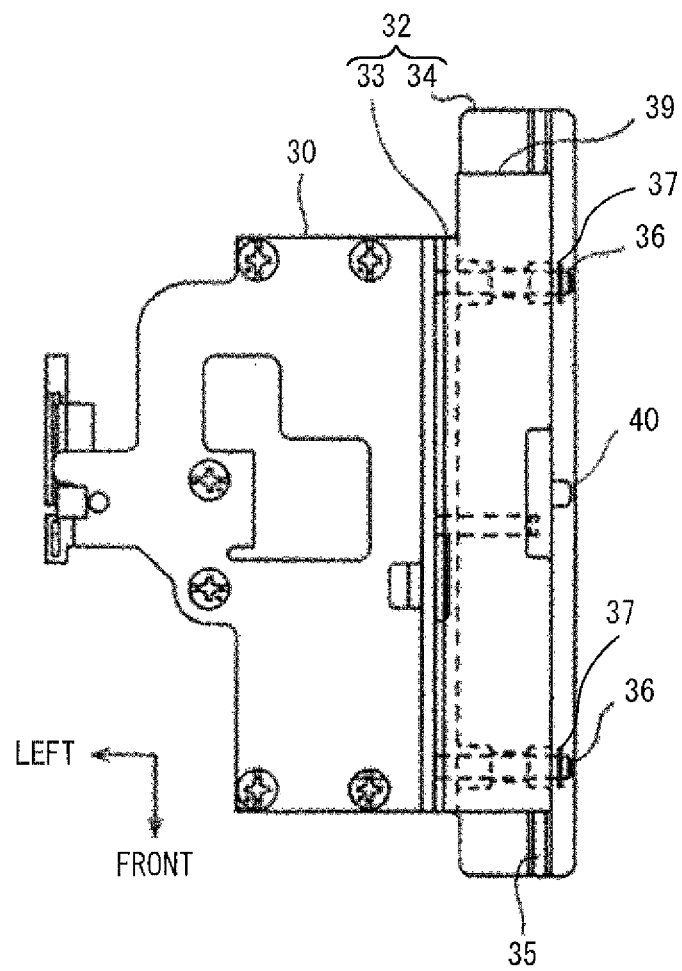
FIG. 3 is a plan view of a carriage 30.

The carriage 30 will be explained with reference to FIG. 3. A bracket 32 is affixed to the carriage 30. The bracket 32 is an L-shaped plate member that has a vertical plate 33 and a horizontal plate 34. A groove 35 that is open along the top is formed in the horizontal plate 34 such that it extends from the front to the rear. Two shafts 36 are affixed to the vertical plate 33 such that they extend toward the right.

A pressure member 39 is mounted on the two shafts 36 such that it can move to the left and the right. Specifically, the pressure member 39 has substantially three-dimensional rectangular shape, with its long axis extending from the front to the rear, and it has two holes in it. The two holes are provided such that they extend from left to right, and each one of the two shafts 36 can be inserted through the corresponding one of the two holes. In a state in which the shafts 36 have been inserted into the corresponding holes, the pressure member 39 is supported such that it can move to the left and the right. Retaining rings 37 are affixed to the right ends of the shafts 36. The retaining rings 37 prevent the pressure member 39 from coming off of the shafts 36. The pressure member 39 is constantly energized toward the right by the elastic force of a compression coil spring (not shown in the drawings). Accordingly, the pressure member 39 is positioned at the point that is farthest to the right within the range in which the pressure member 39 can move to the left and the right. A protruding portion 40 that protrudes to the right is formed on the pressure member 39 approximately midway between the front and the rear.

A detection portion 41 is mounted on the carriage 30. The detection portion 41 detects the shape of a detected portion 51 of the embroidery frame 44 that is held on the carriage 30. The shape of the detected portion 51 is different for each type of embroidery frame. The detection portion 41 is made up of three switches 42 that are lined up in a row in the front-rear direction. The switch 42 is provided with a detection lever 52. The detection lever 52 can be in contact with the detected portion 51. The switch 42 is switched the on and off state by contact the detection lever 52 with the detected portion 51. Based on the on and off states of the three switches 42, the detection portion 41 detects the shape of the detected portion 51. There are a total of eight combinations of the on and off states of the three switches 42. Among the eight combinations, the combination in which all of the switches 42 are off is a case in which no embroidery frame is mounted on the carriage 30. Therefore, the three switches 42 are capable of identifying seven types of embroidery frames.

A mounting portion 46 is formed on the left side of the embroidery frame 44. The mounting portion 46 can be removably inserted between the bottom face of the pressure member 39 and the top face of the horizontal plate 34 from the front. A ridge (not shown in the drawings) that extends from the front to the rear is formed on the bottom face of the mounting portion 46. The ridge engages with the groove 35 that is formed in the top face of the horizontal plate 34. The engaging of the ridge with the groove 35 determines the left-right positioning of the mounting portion 46 with respect to the carriage 30.

On the right edge of the mounting portion 46, a rib 48 is formed that extends toward the front from the rear edge of the mounting portion 46, extending approximately halfway to the front edge of the mounting portion 46. The rib 48 is inclined slightly toward the left as it goes from a rear edge toward the front. A recessed portion 49 that is open on the left side is formed on the rear edge of the rib 48. The recessed portion 49 is capable of engaging with the protruding portion 40 of the pressure member 39. When the mounting portion 46 is inserted into the carriage 30 and moved from the front toward the rear, the left side face of the rib 48 moves as it comes into contact with the tip of the protruding portion 40 of the pressure member 39. At this time, because the rib 48 is inclined to the left as described above, the pressure member 39, together with the protruding portion 40, is pressed to the left against the elastic force of the compression coil spring and moves slowly to the left. When the mounting portion 46 moves farther toward the rear and reaches the position where the recessed portion 49 can engage with the protruding portion 40, the pressure member 39 is moved toward the right by the elastic force of the compression coil spring, and the protruding portion 40 engages with the recessed portion 49. The front-rear positioning of the mounting portion 46 with respect to the carriage 30 is thus determined.

The determining of the front-rear positioning of the mounting portion 46 with respect to the carriage 30 as just described determines the positioning of the embroidery frame 44 with respect to the carriage 30. Note that when the user removes the embroidery frame 44 from the carriage 30, the pressure member 39 is pressed to the left against the elastic force of the compression coil spring, disengaging the protruding portion 40 and the recessed portion 49. In this state, the user removes the embroidery frame 44 by moving the mounting portion 46 toward the front.

The detected portion 51 is formed on the mounting portion 46. When the mounting portion 46 is mounted on the carriage 30, the detection lever 52 of at least one of the three switches 42 is pressed by the detected portion 51, and the switch 42 changes to the on state.

Figure 4:
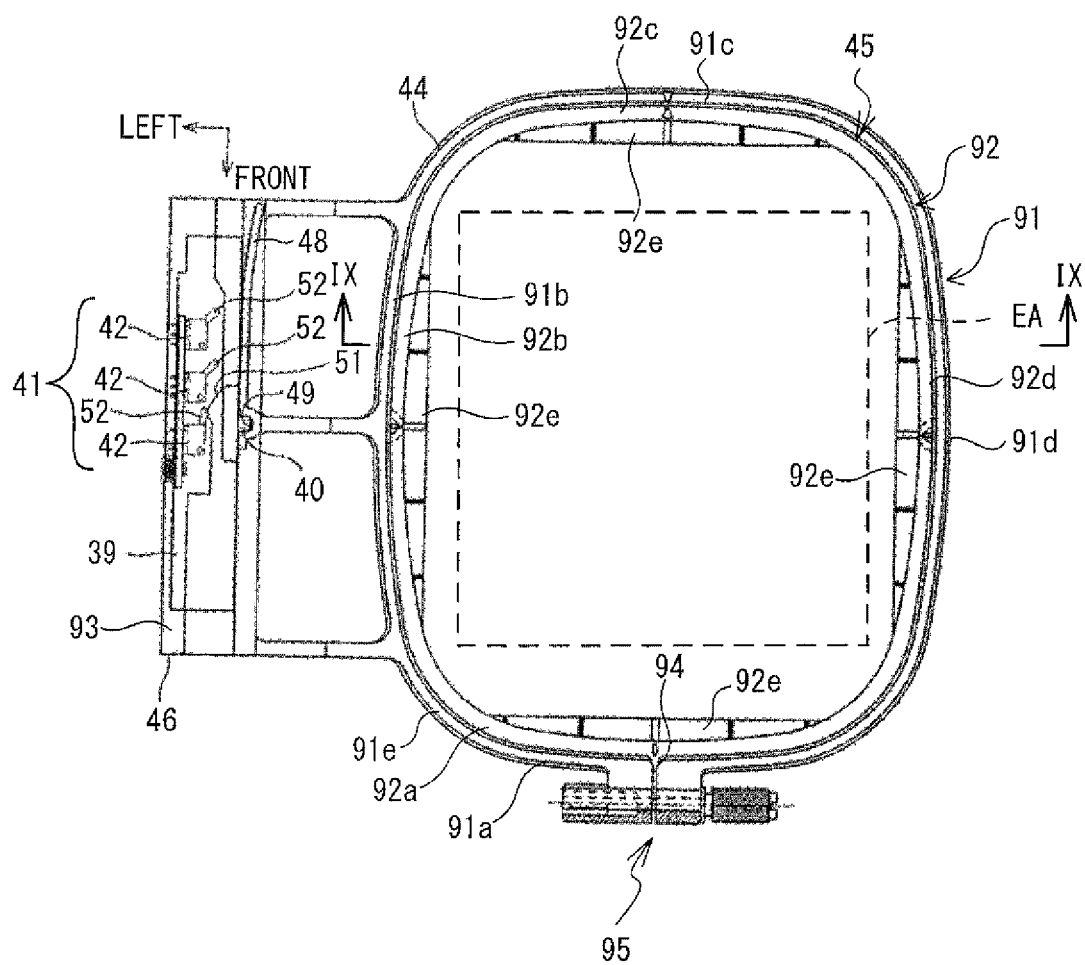
FIG. 4 is a plan view that shows an embroidery frame 44 that has been mounted on a mounting portion 46.

Specifically, when, from among the plurality of types of the embroidery frames, the embroidery frame 44 that is shown in FIG. 4 is mounted on the carriage 30, the detection lever 52 of the switch 42 that is farthest toward the front is pressed by the detected portion 51, and the switch 42 that is farthest toward the front changes to the on state.

A frame portion 45 of the embroidery frame 44 will be explained. The embroidery frame 44 is nearly rectangular in a plan view. The frame portion 45 includes the outer frame 91 and the inner frame 92. A sewing-enabled area EA for the embroidery frame 44 is set on the inner side of the inner frame 92. Note that the work cloth 300 has been omitted from FIG. 4 to facilitate the explanation.

The outer frame 91 has four outer frame sides 91a to 91d that are positioned within a horizontal plane, as well as four corner portions 91e. Each of the outer frame sides 91a to 91d has a substantially straight shape. The corner portion 91e has a curved shape. A parting portion 94 is formed in the front edge of the outer frame side 91a. The parting portion 94 extends through the outer frame side 91a from the front to the rear at a point that is midway between the left and right ends of the outer frame side 91a. A tightening mechanism 95 is provided in the parting portion 94. The tightening mechanism 95 is capable of tightening the outer frame 91 in relation to the inner frame 92.

The inner frame 92 has a substantially rectangular shape. The inner frame 92 has four inner frame sides 92a to 92d that are positioned within a horizontal plane, as well as four curved corners portion. A rib 92e that projects to the inner side of the inner frame 92 is formed at the bottom of the inner circumferential edge of each one of the inner frame sides 92a to 92d. The inner frame 92 is reinforced by the ribs 92e.

Figure 5:
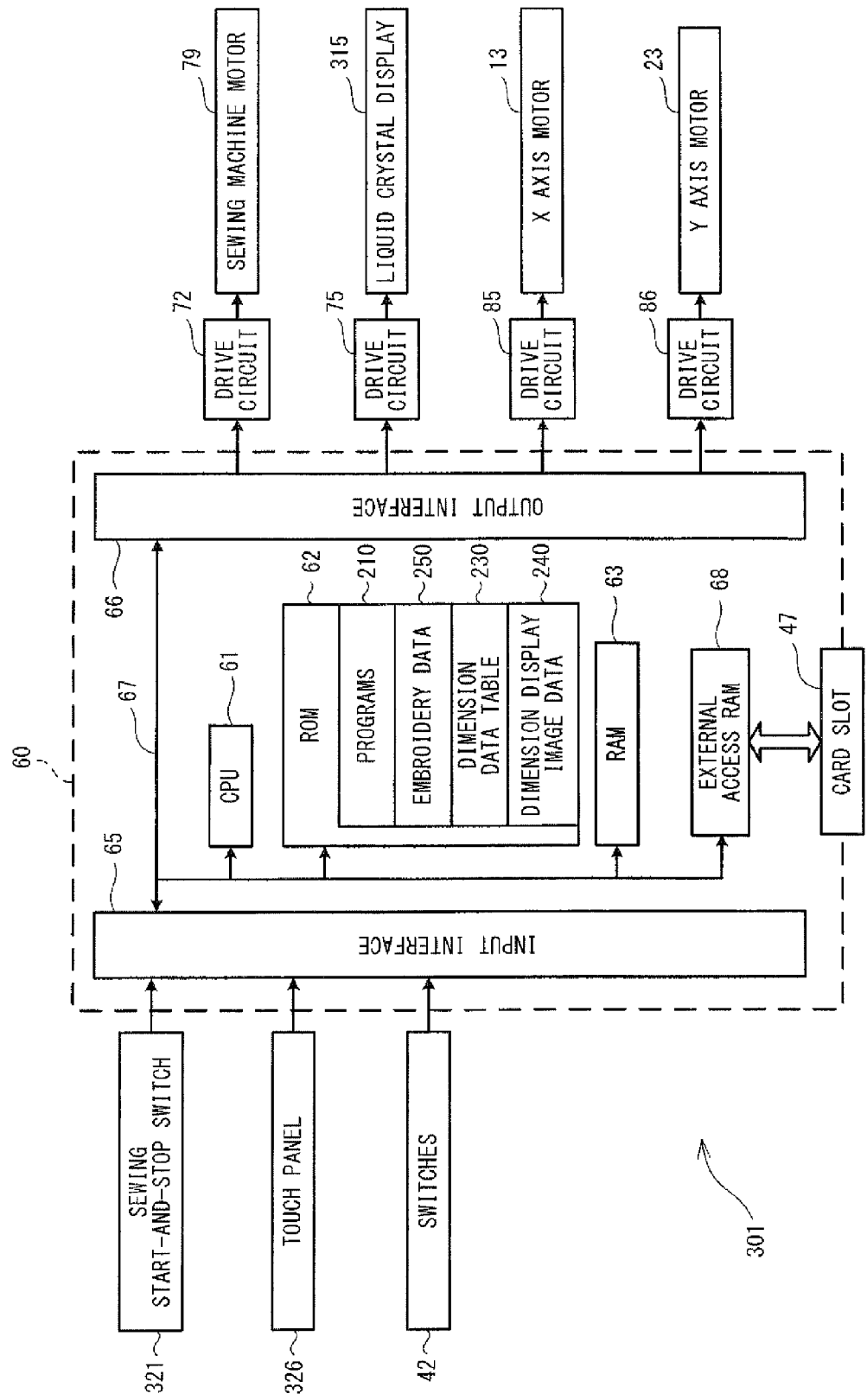
FIG. 5 is a block diagram that shows an electrical configuration of the sewing machine 301.

An electrical configuration of the sewing machine 301 will be explained with reference to FIG. 5. The control portion 60 of the sewing machine 301 includes a CPU 61, a ROM 62, a RAM 63, a card slot 47, an external access RAM 68, an input interface 65, and an output interface 66, all of which are electrically connected to one another by a bus 67. The sewing start-and-stop switch 321, the touch panel 326, and the switches 42 are electrically connected to the input interface 65. Drive circuits 72, 75, 85, and 86 are electrically connected to the output interface 66. The drive circuit 72 drives the sewing machine motor 79. The drive circuit 75 drives the LCD 315. The drive circuits 85 and 86 respectively drive the X axis motor 13 and the Y axis motor 23 that move the embroidery frame 44.

The CPU 61 performs main control of the sewing machine 301 and performs various types of computations and processing in accordance with programs 210 that are stored in the ROM 62, which is a read-only storage element. The ROM 62 stores the programs 210, embroidery data 250, a dimension data table 230, and dimension display image data 240. In a first embodiment, the programs 210 include a frame selection program 211. The embroidery data 250 include coordinate data for needle drop points that form the embroidery patterns and dimension data for the embroidery patterns. The dimension display image data 240 are image data for displaying one embroidery frame, the work cloths that are compatible with the embroidery frame, and the dimensions of the those work cloths, with one set of the image data for each one of the plurality of types of the embroidery frames. The RAM 63 is a freely readable and writable storage element. The RAM 63 stores computation results of computational processing by the CPU 61.

The dimension data table 230 will be explained with reference to FIG. 6. The dimension data table 230 includes the sizes of a plurality of sewing-enabled areas EA and the sizes of a plurality of work cloths, in correspondence with a plurality of types of embroidery frames. Each one of the work cloths occupies a horizontal plane that includes a front-to-rear dimension and a left-to-right dimension, and each work cloth has parallel sides in each of those dimensions. Furthermore, the sizes of the sewing-enabled areas EA and the sizes of the work cloths are expressed in terms of the lengths of the parallel sides in the front-to-rear dimension (the vertical dimension) and the lengths of the parallel sides in the left-to-right dimension (the horizontal dimension), within the horizontal plane that includes the front-to-rear dimension and the left-to-right dimension. The types of the embroidery frames may include, for example, small, medium, large, and extra large frames, a quilting frame, a clamping frame, a jumbo frame, a round frame, and the like, although a detailed explanation will be omitted. For example, the vertical dimension G1 (300 mm) of the work cloth that corresponds to the large frame is a value that is obtained by adding a value F1 (60 mm) for the margin at each one of the front edge and the rear edge to the vertical dimension E1 (180 mm) for the corresponding sewing-enabled area EA. Further, the horizontal dimension G2 (210 mm) of the work cloth that corresponds to the large frame is a value that is obtained by adding a value F2 (40 mm) for the margin at each one of the left edge and the right edge to the horizontal dimension E2 (130 mm) for the corresponding sewing-enabled area EA. In a case where the type of the embroidery frame is a round frame, the size of the sewing-enabled area EA is indicated by the diameter of the frame. For the purpose of identifying the ten types of embroidery frames that are shown in the dimension data table 230, it is sufficient that the detection portion 41 is comprised of four switches 42. Combinations of the on and off states of four of the switches 42 can be used to identify fifteen types of embroidery frames.

Frame Selection Program 211

The frame selection program 211 will be explained with reference to FIG. 7. The frame selection program 211 is executed by the CPU 61 of the sewing machine 301. In a case where the user has displayed a screen for selecting an embroidery pattern, by touching the touch panel 326, for example, the CPU 61 reads the programs 210 from the ROM 62 and executes the frame selection program 211. Each step that is shown in the flowchart indicates processing by the CPU 61. Note that, to facilitate the explanation, the types of the embroidery frames that are processed by the frame selection program 211 are limited to the large frame, the medium frame, and the small frame, but the other types of embroidery frames that are shown in FIG. 6 may also be included.

At Step S13, the CPU 61 accepts the designation of an embroidery pattern. When the user uses a finger to touch the position on the touch panel 326 that corresponds to the desired embroidery pattern, the CPU 61 stores the data for the corresponding embroidery pattern in the RAM 63.

At Step S14, the embroidery frames whose sewing-enabled areas are larger than the embroidery pattern that was designated at Step S13 are identified in the dimension data table 230. Assume, for example, that the dimensions (vertical× horizontal) of the embroidery pattern are 40 mm×30 mm. The dimensions (vertical×horizontal) of the sewing-enabled area EA of the small frame are 60 mm×40 mm. Comparing the two sets of dimensions, the vertical dimension of 60 mm is greater than 40 mm, and the horizontal dimension of 40 mm is greater than 30 mm, so the size of the sewing-enabled area EA of the small frame is not smaller than the size of the embroidery pattern. Therefore, in the dimension data table 230, the CPU 61 identifies the large frame, the medium frame, and the small frame as the embroidery frames whose sizes are not smaller than the size of the small frame.

At Step S15, the CPU 61 displays the identified embroidery frames on the LCD 315. Specifically, the CPU 61 displays on the LCD 315 images of the embroidery frames that were identified at Step S14 as having sewing-enabled areas that are larger than the embroidery pattern. In the example described above, the small frame, the medium frame, and the large frame were identified at Step S14, so the CPU 61 displays images of those three embroidery frames in a row on the LCD 315. Specifically, the CPU 61 outputs to the LCD 315, through the drive circuit 75, control signals for displaying an embroidery frame selection screen. The embroidery frame selection screen is a screen that is displayed in order for the user to select the embroidery frame. The LCD 315 displays the embroidery frame selection screen in accordance with the control signals from the CPU 61. More specifically, the CPU 61 reads, from the ROM 62, image information that describes the embroidery frame selection screen and image data for the embroidery frames, then transmits image signals to the LCD 315.

At Step S17, the CPU 61 accepts the designation of the type of the embroidery frame 44. When the user uses a finger to touch the position on the touch panel 326 that corresponds to the desired embroidery frame, among the embroidery frames that are displayed on the LCD 315, the CPU 61 stores the data for the corresponding embroidery frame in the RAM 63.

At Step S19, the CPU 61 determines whether the type of embroidery frame that was designated at Step S17 is the small frame. In a case where the CPU 61 determines that the type of embroidery frame that was designated at Step S17 is the small frame (YES at Step S19), the CPU 61 advances the processing to Step S21. In a case where the CPU 61 determines that the type of embroidery frame that was designated at Step S17 is not the small frame (NO at Step S19), the CPU 61 advances the processing to Step S24.

At Step S21, the CPU 61 reads, from the ROM 62, the size of the work cloth 300 that corresponds to the small frame, which is the type of embroidery frame that was designated at Step S17. Specifically, from the dimension data table 230 in the ROM 62 that is shown in FIG. 6, the CPU 61 reads "180 mm×120 mm," which are the dimension data for the work cloth 300 that corresponds to the small frame. In the present embodiment, the CPU 61 reads from the ROM 62 the dimension display image data 240 that correspond to the small frame.

At Step S23, the CPU 61 displays on the LCD 315 the size of the work cloth 300 that was read at Step S21. Specifically, the CPU 61 outputs to the LCD 315, through the drive circuit 75, the dimension display image data 240 that correspond to the small frame. In accordance with the dimension display image data 240, the LCD 315 displays a dimension display image that corresponds to the small frame. The dimension display image that corresponds to the small frame is an image that includes an image of a portion of the shape of the small frame (mainly the frame portion), an image of the sewing-enabled area EA for the small frame, an image of the work cloth 300 of the size that corresponds to the small frame, and the dimensions of the work cloth 300. After completing the processing at Step S23, the CPU 61 terminates the frame selection program 211.

Figure 8:
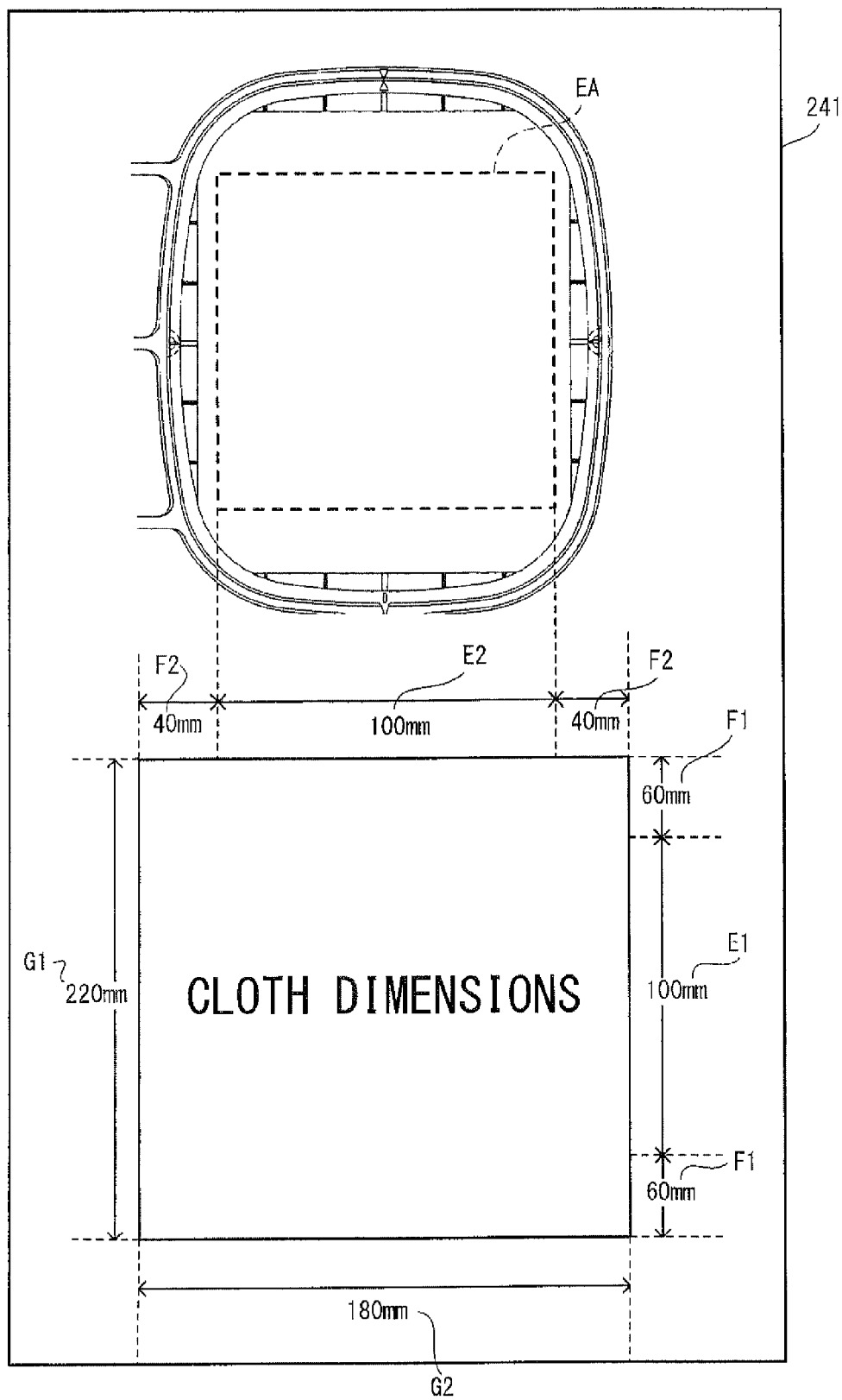
FIG. 8 is a dimension display image 241 on which a size of a work cloth is displayed.

A dimension display image 241 will be explained with reference to FIG. 8. The dimension display image 241 will be explained using a dimension display image that corresponds to the medium frame as an example. The dimension display image 241 is an image that includes an image of one embroidery frame, an image of the work cloth 300 that corresponds to that embroidery frame, the dimensions of the work cloth 300 that corresponds to that embroidery frame, and the dimensions of the sewing-enabled area EA that corresponds to that embroidery frame. The dimension display image 241 is displayed such that the image of the one embroidery frame and the image of the work cloth 300 that corresponds to that embroidery frame are arrayed vertically. Note that in the dimension display image 241, a portion of the shape of the embroidery frame (mainly the frame portion) is displayed, rather than displaying the entire embroidery frame. For the dimensions of the work cloth 300, the vertical dimension G1 (220 mm) and the horizontal dimension G2 (180 mm) are displayed. For the dimensions of the sewing-enabled area EA, the vertical dimension E1 (100 mm) and the horizontal dimension E2 (100 mm) are displayed. The dimension G1 of the work cloth 300 is a value that is obtained by adding the specified dimension F1 (60 mm) for the margin at each one of the front edge and the rear edge to the dimension E1 for the sewing-enabled area EA. The dimension G2 of the work cloth 300 is a value that is obtained by adding the specified dimension F2 (40 mm) for the margin at each one of the left edge and the right edge to the dimension E2 for the sewing-enabled area EA.

At Step S24, the CPU 61 determines whether the type of embroidery frame that was designated at Step S17 is the medium frame. In a case where the CPU 61 determines that the type of embroidery frame that was designated at Step S17 is the medium frame (YES at Step S24), the CPU 61 advances the processing to Step S25. In a case where the CPU 61 determines that the type of embroidery frame that was designated at Step S17 is not the medium frame (NO at Step S24), the CPU 61 advances the processing to Step S27.

At Step S25, the CPU 61 reads, from the ROM 62, the size of the work cloth 300 that corresponds to the medium frame, which is the type of embroidery frame that was designated at Step S17. Specifically, from the dimension data table 230 in the ROM 62 that is shown in FIG. 6, the CPU 61 reads "220 mm×180 mm," which are the dimension data for the work cloth 300 that corresponds to the medium frame. In the present embodiment, the CPU 61 reads from the ROM 62 the dimension display image data 240 that correspond to the medium frame, for which the dimension data for the work cloth 300 are "220 mm×180 mm".

At Step S26, the CPU 61 displays on the LCD 315 the size of the work cloth 300 that was read at Step S25. Specifically, the CPU 61 outputs to the LCD 315, through the drive circuit 75, the dimension display image data 240 that correspond to the medium frame. In accordance with the dimension display image data 240 that have been output by the CPU 61, the LCD 315 displays the dimension display image 241 that corresponds to the medium frame. The dimension display image 241 that corresponds to the medium frame is an image that includes an image of the medium frame, an image of the work cloth 300 of the size that corresponds to the medium frame, and the dimensions of the work cloth 300. After completing the processing at Step S26, the CPU 61 terminates the frame selection program 211.

At Step S27, the CPU 61 reads, from the ROM 62, the size of the work cloth 300 that corresponds to the large frame, which is the type of embroidery frame that was designated at Step S17. Specifically, from the dimension data table 230 in the ROM 62 that is shown in FIG. 6, the CPU 61 reads "300 mm×210 mm," which are the dimension data for the work cloth 300 that corresponds to the large frame. In the present embodiment, the CPU 61 reads from the ROM 62 the dimension display image data 240 that correspond to the large frame, for which the data are "300 mm×210 mm".

At Step S28, the CPU 61 displays on the LCD 315 the size of the work cloth 300 that was read at Step S27. Specifically, the CPU 61 outputs to the LCD 315, through the drive circuit 75, the dimension display image data 240 that correspond to the large frame. In accordance with the dimension display image data 240 that have been output by the CPU 61, the LCD 315 displays the dimension display image that corresponds to the large frame. The dimension display image that corresponds to the large frame is an image that includes an image of the large frame, an image of the work cloth of the size that corresponds to the large frame, and the dimensions of the work cloth. After completing the processing at Step S28, the CPU 61 terminates the frame selection program 211.

The specified dimensions F1, F2 in a case where the work cloth 300 is held by the inner frame 92 and the outer frame 91 will be explained with reference to FIG. 9. The specified dimensions F1, F2 include lengths D1, D2, D3. The length D1 is equivalent to the left-right (horizontal) distance from an outer circumferential face 92$f$ of the inner frame 92 to the inner edge (the edge on the inner side of the rib 92$e$) of the inner frame 92. The length D2 is equivalent to the left-right (horizontal) distance from an inner circumferential face 91$f$ of the outer frame 91 to the outer edge of the outer frame 91. The length D3 is equivalent to the vertical distance between the top face and the bottom face of the embroidery frame 44, along the mutually opposing faces of the outer circumferential face 92$f$ of the inner frame 92 and the inner circumferential face 91$f$ of the outer frame 91. Accordingly, the specified dimension F1 equals D1+D2+D3. However, to allow for some imprecision, it is preferable to define the specified dimension F1 as not less than D1+D2+D3. Defining the specified dimension F1 as not less than D1+D2+D3 makes it possible for the work cloth 300 to be held reliably, even if the embroidery frame 44 clamps the work cloth 300 between the inner frame 92 and the outer frame 91.

Effects of First Embodiment

The sewing machine 301 according to the first embodiment displays on the LCD 315 the size of the work cloth 300 that corresponds to the embroidery frame 44 that the user has designated, using the vertical dimensions and the horizontal dimensions of the work cloth 300. The user is therefore able to know the size of the work cloth 300 that corresponds to the embroidery frame 44 in terms of specific numerical values. Therefore, based on the specific numerical values that are displayed on the LCD 315, the user is able to measure the dimensions of a work cloth with a ruler or the like and cut the work cloth to the appropriate size.

Along with the dimensions of the work cloth 300 that corresponds to the embroidery frame 44 that the user has designated, the LCD 315 displays an image of the embroidery frame 44 that the user has designated and an image of the work cloth 300 whose size corresponds to the type of that embroidery frame 44. Therefore, in addition to knowing accurate numerical values for the size of the work cloth, the user is able to know sensuously the size of the work cloth that corresponds to the embroidery frame.

Figure 9:
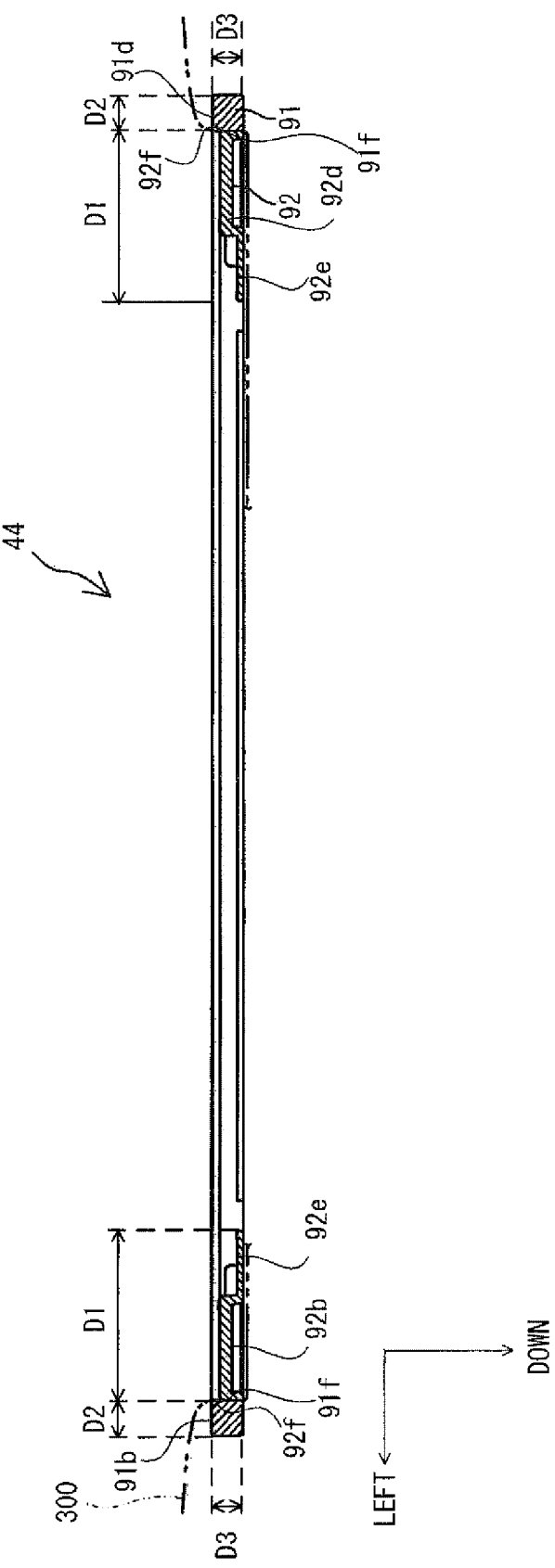
FIG. 9 is a section view of the embroidery frame 44 along a line IX-IX in FIG. 4; as seen from the direction indicated by the arrows in FIG. 4.

As shown in FIG. 9, when the work cloth 300 is held in the embroidery frame 44, it is preferable for the size of the work cloth 300 to be such that the work cloth 300 extends to the outside of the inner circumferential face 91f of the outer frame 91 by a specified amount D4. The specified amount D4 may be ten to twenty millimeters, for example. The reason for doing this is that it is necessary to take into account the case that the position of the work cloth 300 may slip in relation to the outer frame 91 when the user places the work cloth 300 into the embroidery frame 44. Furthermore, in the state in which the work cloth 300 is held in the embroidery frame 44, in order to make the work cloth 300 within the sewing-enabled area EA appropriately taut horizontally, the user uses his fingers to pull toward the outside the portion of the work cloth 300 that extends to the outside of the embroidery frame 44. For that purpose, it is necessary to provide a portion of the work cloth 300 that the user can grasp in order to pull the work cloth 300 taut. Holding the work cloth 300 in the embroidery frame 44 in an appropriately taut state makes it possible for the sewing machine 301 to sew the embroidery pattern more accurately on the work cloth 300. As just described, the specified dimension F1 may be a dimension in which the specified amount D4 has been added to D1+D2+D3. However, in a case where F1 is greater than D1+D2+D3+D4, it may sometimes happen that the outer edges of the work cloth 300 will extend significantly to the outside of the embroidery frame 44 and interfere with the sewing when the embroidery frame 44 is mounted on the sewing machine 301. Therefore, in a case where the work cloth 300 is held in the embroidery frame 44, it is preferable for the specified amount D4, which is the distance from the inner circumferential face 91f of the outer frame 91 to the edges of the work cloth 300, to be such that the outer edges of the work cloth 300 do not interfere with the sewing. Accordingly, the appropriate size of the work cloth in relation to the embroidery frame may be prescribed such that F1 is not less than D1+D2+D3 and not greater than D1+D2+D3+D4, for example.

In the same manner as F1, F2 is prescribed to be not less than D1+D2+D3 and not greater than D1+D2+D3+D4. Furthermore, F1 (60 mm) is greater than F2 (40 mm). This is because the distance from the edge of the sewing-enabled area EA to the inner circumferential face of the inner shuttle 92 in the vertical dimension is greater than the distance from the edge of the sewing-enabled area EA to the inner circumferential face of the inner shuttle 92 in the horizontal dimension.

The LCD 315 displays the dimensions of the work cloth that corresponds to the type of the embroidery frame that the user has designated. The designating of the embroidery frame that he plans to use makes it possible for the user to know the dimensions of the appropriate work cloth that corresponds to the embroidery frame. The user can therefore measure the dimensions of the work cloth, based on the dimensions that are displayed on the LCD 315, and can cut the work cloth to the appropriate size.

Second Embodiment

Figure 10:
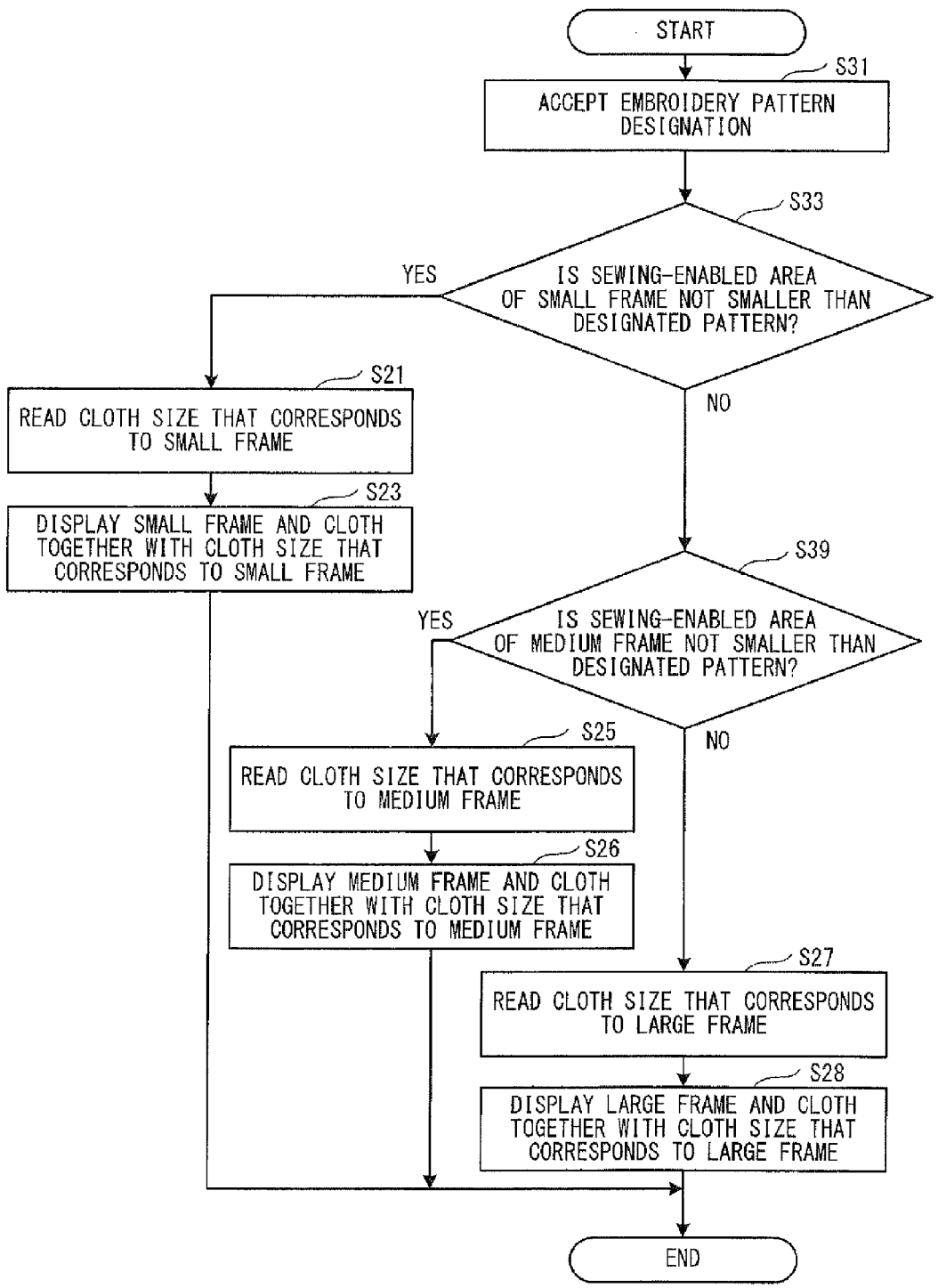
FIG. 10 is a flowchart that shows processing of a pattern determination program 212 in a second embodiment.

A second embodiment will be explained with reference to FIG. 10. Essentially, the programs 210 of the second embodiment differ from those of the first embodiment in that a pattern determination program 212 is provided instead of the frame selection program 211. Note that for those elements that have the same configuration as in the first embodiment, the same reference numerals are assigned, and explanations will be omitted.

Pattern Determination Program 212

The pattern determination program 212 will be explained with reference to FIG. 10. The pattern determination program 212 is executed by the CPU 61 of the sewing machine 301. In a case where the user has displayed a screen for selecting an embroidery pattern, by touching the touch panel 326, for example, the CPU 61 reads the programs 210 from the ROM 62 and executes the pattern determination program 212.

At Step S31, the CPU 61 accepts the designation of an embroidery pattern. When the user uses a finger to touch the position on the touch panel 326 that corresponds to the desired embroidery pattern, the CPU 61 stores the data for the corresponding embroidery pattern in the RAM 63.

At Step S33, the CPU 61 determines whether the size of the sewing-enabled area EA of the small frame is not smaller than the size of the embroidery pattern that was designated at Step S31. In a case where the CPU 61 determines that the size of the sewing-enabled area EA of the small frame is not smaller than the size of the embroidery pattern that was designated at Step S31 (YES at Step S33), the CPU 61 advances the processing to Step S21. In a case where the CPU 61 determines that the size of the sewing-enabled area EA of the small frame is smaller than the size of the embroidery pattern that was designated at Step S31 (NO at Step S33), the CPU 61 advances the processing to Step S39. Assume, for example, that the dimensions (vertical×horizontal) of the sewing-enabled area EA of the small frame are 60 mm×40 mm, and that the dimensions (vertical×horizontal) of the embroidery pattern are 40 mm×30 mm. Comparing the two sets of dimensions, the vertical dimension of 60 mm is greater than 40 mm, and the horizontal dimension of 40 mm is greater than 30 mm, so the size of the sewing-enabled area EA of the small frame is not smaller than the size of the embroidery pattern.

At Step S21, the CPU 61 reads, from the ROM 62, the size of the work cloth 300 that corresponds to the small frame, which was determined to be not smaller than the size of the embroidery pattern at Step S33. At Step S23, the CPU 61 displays on the LCD 315 the size of the work cloth 300 that was read at Step S21. Specifically, in the same manner as in the first embodiment, as shown in FIG. 8, the CPU 61 causes the LCD 315 to displays the dimension display image that corresponds to the small frame, that is, an image of a portion of the shape of the small frame (mainly the frame portion), an image of the sewing-enabled area EA for the small frame, an image of the work cloth 300 of the size that corresponds to the small frame, and the dimensions of the work cloth 300. After completing the processing at Step S23, the CPU 61 terminates the pattern determination program 212.

At Step S39, the CPU 61 determines whether the size of the sewing-enabled area EA of the medium frame is not smaller than the size of the embroidery pattern that was designated at Step S31. In a case where the CPU 61 determines that the size of the sewing-enabled area EA of the medium frame is not smaller than the size of the embroidery pattern that was designated at Step S31 (YES at Step S39), the CPU 61 advances the processing to Step S25. In a case where the CPU 61 determines that the size of the sewing-enabled area EA of the medium frame is smaller than the size of the embroidery pattern that was designated at Step S31 (NO at Step S39), the CPU 61 advances the processing to Step S27. Assume, for example, that the dimensions (vertical×horizontal) of the embroidery pattern are 120 mm×80 mm. Assume that the dimensions (vertical×horizontal) of the sewing-enabled area EA of the medium frame are 100 mm×100 mm. Comparing the two sets of dimensions, the vertical dimension of 100 mm is less than 120 mm, and the horizontal dimension of 100 mm is greater than 80 mm, so the size of the sewing-enabled area EA of the medium frame is smaller than the size of the embroidery pattern and advances the processing to Step S27.

At Step S25, the CPU 61 reads the size of the work cloth 300 that corresponds to the medium frame, which was determined to be not smaller than the size of the embroidery pattern at Step S39. At Step S26, the CPU 61 displays on the LCD 315 the size of the work cloth 300 that was read at Step S25. After completing the processing at Step S26, the CPU 61 terminates the pattern determination program 212.

At Step S27, the CPU 61 reads the size of the work cloth 300 that corresponds to the large frame, which is larger than the medium frame, for which the size of the sewing-enabled area EA was determined to be smaller than the size of the embroidery pattern at Step S39. At Step S28, the CPU 61 displays on the LCD 315 the size of the work cloth 300 that was read at Step S27. After completing the processing at Step S28, the CPU 61 terminates the pattern determination program 212.

Effects of Second Embodiment

The sewing machine 301 according to the second embodiment displays on the LCD 315 the size of the work cloth 300 on which the embroidery pattern that the user has designated can be sewn. By designating of the embroidery pattern that he plans to sew, the user causes the appropriate dimensions of the work cloth that correspond to the embroidery pattern to be displayed. The user is therefore able to know the appropriate size of the work cloth that corresponds to the embroidery pattern in terms of specific numerical values. Therefore, based on the specific numerical values that are displayed on the LCD 315, the user is able to measure the dimensions of a work cloth and cut the work cloth to the appropriate size.

Third Embodiment

Figure 11:
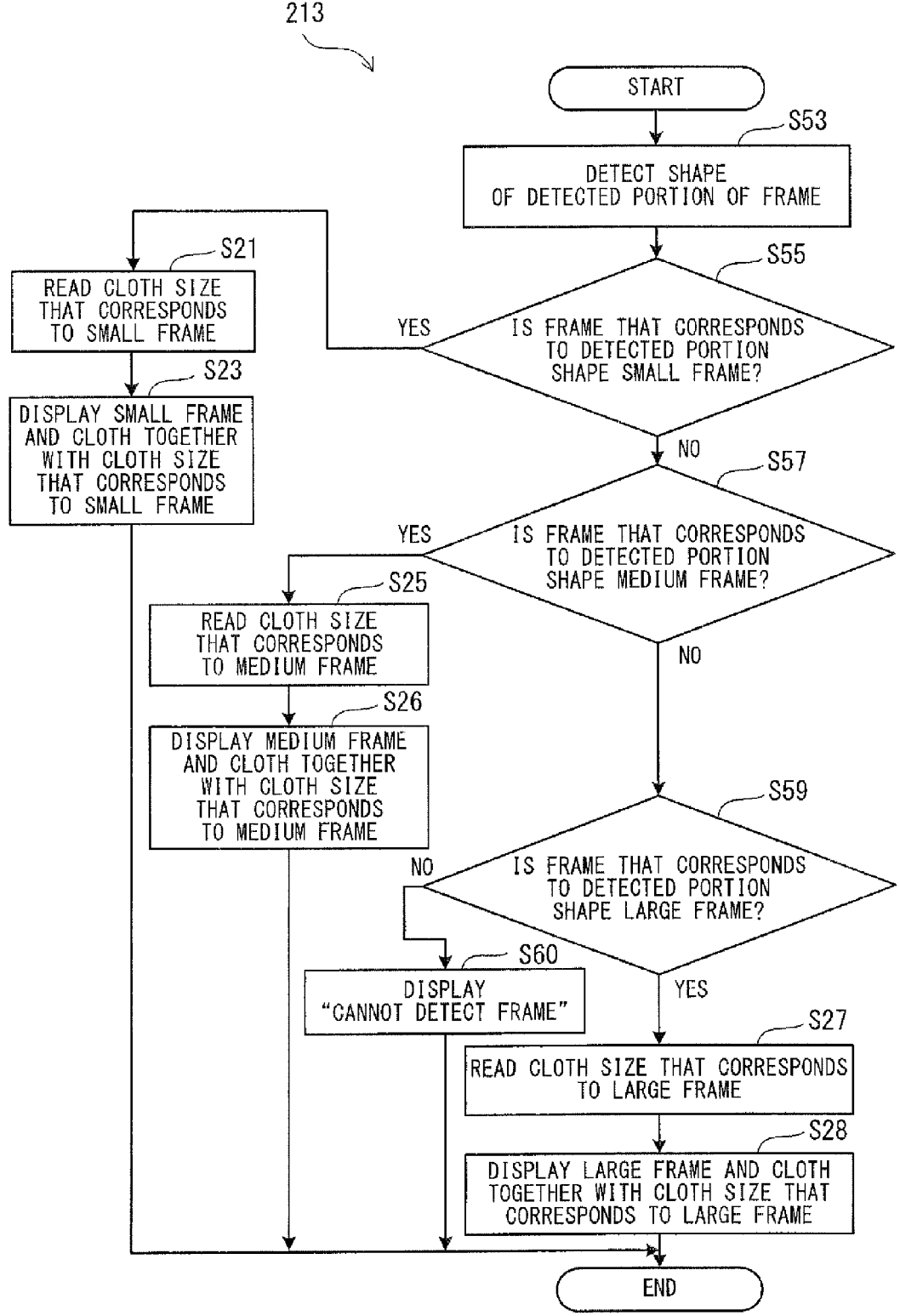
FIG. 11 is a flowchart that shows processing of a frame detection program 213 in a third embodiment.

A third embodiment will be explained with reference to FIG. 11. Essentially, the third embodiment differs from the first embodiment in that the programs 210 are provided with a frame detection program 213 instead of the frame selection program 211. Note that for those elements that have the same configuration as in the first embodiment, the same reference numerals are assigned, and explanations will be omitted.

Frame Detection Program 213

The frame detection program 213 will be explained with reference to FIG. 11. The frame detection program 213 is executed by the CPU 61 of the sewing machine 301. In a case where the user has displayed a screen for selecting an embroidery pattern, by touching the touch panel 326, for example, the CPU 61 reads the programs 210 from the ROM 62 and executes the frame detection program 213.

At Step S53, the CPU 61 causes the detection portion 41 to detect the shape of the detected portion 51 of the embroidery frame that is mounted on the carriage 30. Then the CPU 61 receives signals that are transmitted from the detection portion 41 and that indicate the shape of the detected portion 51. The signals that indicate the shape of the detected portion 51 are on and off signals for the three switches 42. If the on signal is defined as "1" and the off signal is defined as "0", then in a case where the signals that the CPU 61 has received are "1, 0, 0", for example, the CPU 61 is able to identify the embroidery frame that is mounted on the carriage 30 as the medium frame or the like.

At Step S55, the CPU 61 determines whether the embroidery frame that corresponds to the shape of the detected portion 51 that was detected by the detection portion 41 is the small frame. In a case where the CPU 61 determines that the embroidery frame that corresponds to the shape of the detected portion 51 that was detected by the detection portion 41 is the small frame (YES at Step S55), the CPU 61 advances the processing to Step S21. After completing the processing at Steps S21 and S23, the CPU 61 terminates the frame detection program 213. In a case where the CPU 61 determines that the embroidery frame that corresponds to the shape of the detected portion 51 that was detected by the detection portion 41 is not the small frame (NO at Step S55), the CPU 61 advances the processing to Step S57.

At Step S21, the CPU 61 reads, from the ROM 62, the size of the work cloth 300 that corresponds to the type of the embroidery frame that was identified based on the shape of the detected portion 51 that was detected by the detection portion 41. Specifically, from the dimension data table 230 in the ROM 62, the CPU 61 reads the size of the work cloth 300 that corresponds to the small frame, which corresponds to the shape of the detected portion 51. At Step S23, the CPU 61 displays on the LCD 315 the size of the work cloth 300 that was read at Step S21. Specifically, in the same manner as in the first embodiment, as shown in FIG. 8, the CPU 61 causes the LCD 315 to displays the dimension display image 241 that corresponds to the small frame, that is, an image of a portion of the shape of the small frame (mainly the frame portion), an image of the sewing-enabled area EA for the small frame, an image of the work cloth 300 of the size that corresponds to the small frame, and the dimensions of the work cloth 300. After completing the processing at Step S23, the CPU 61 terminates the frame detection program 213.

At Step S57, the CPU 61 determines whether the embroidery frame that corresponds to the shape of the detected portion 51 that was detected by the detection portion 41 is the medium frame. In a case where the CPU 61 determines that the embroidery frame that corresponds to the shape of the detected portion 51 that was detected by the detection portion 41 is the medium frame (YES at Step S57), the CPU 61 advances the processing to Step S25. In a case where the CPU 61 determines that the embroidery frame that corresponds to the shape of the detected portion 51 that was detected by the detection portion 41 is not the medium frame (NO at Step S57), the CPU 61 advances the processing to Step S59.

At Step S25, the CPU 61 reads, from the ROM 62, the size of the work cloth 300 that corresponds to the type of the embroidery frame that was identified based on the shape of the detected portion 51 that was detected by the detection portion 41. Specifically, from the dimension data table 230 in the ROM 62, the CPU 61 reads the size of the work cloth 300 that corresponds to the medium frame, which corresponds to the shape of the detected portion 51. At Step S26, the CPU 61 displays on the LCD 315 the size of the work cloth 300 that was read at Step S25. After completing the processing at Step S26, the CPU 61 terminates the frame detection program 213.

At Step S59, the CPU 61 determines whether the embroidery frame that corresponds to the shape of the detected portion 51 that was detected by the detection portion 41 is the large frame. In a case where the CPU 61 determines that the embroidery frame that corresponds to the shape of the detected portion 51 that was detected by the detection portion 41 is the large frame (YES at Step S59), the CPU 61 advances the processing to Step S27. After completing the processing at Steps S27 and S28, the CPU 61 terminates the frame detection program 213. In a case where the CPU 61 determines that the embroidery frame that corresponds to the shape of the detected portion 51 that was detected by the detection portion 41 is not the large frame (NO at Step S59), the CPU 61 advances the processing to Step S60.

At Step S27, the CPU 61 reads, from the ROM 62, the size of the work cloth 300 that corresponds to the type of the embroidery frame that was identified based on the shape of the detected portion 51 that was detected by the detection portion 41. Specifically, from the dimension data table 230 in the ROM 62, the CPU 61 reads the size of the work cloth 300 that corresponds to the large frame, which corresponds to the shape of the detected portion 51. At Step S28, the CPU 61 displays on the LCD 315 the size of the work cloth 300 that was read at Step S27. After completing the processing at Step S28, the CPU 61 terminates the frame detection program 213.

At Step S60, the CPU 61 displays on the LCD 315 an error screen that indicates that the embroidery frame cannot be detected. Specifically, the error screen is a screen that displays the message "Cannot detect embroidery frame." In the third embodiment, the on and off combinations that are stored in the ROM 62 are only the combinations of on and off states that correspond to the small frame, the medium frame, and the large frame. Therefore, in a case where the combination of the on and off states of the three switches 42 of the detection portion 41 is not a combination of on and off states that corresponds to one of the small frame, the medium frame, and the large frame, the LCD 315 displays the message "Cannot detect embroidery frame." Specifically, through the drive circuit 75, the CPU 61 outputs to the LCD 315 a control signal for displaying the error screen. The LCD 315 displays the error screen in accordance with the control signal from the CPU 61. More specifically, from the ROM 62, the CPU 61 reads image information that describes the error screen, then transmits an image signal to the LCD 315. After completing the processing at Step S60, the CPU 61 terminates the frame detection program 213.

Effects of Third Embodiment

The sewing machine 301 according to the third embodiment displays on the LCD 315 the dimensions of the work cloth that corresponds to the embroidery frame that the user has mounted on the carriage 30. By mounting the embroidery frame that will be used for sewing on the carriage 30, the user causes the appropriate dimensions of the work cloth that correspond to the mounted embroidery frame to be displayed. The user is therefore able to know the appropriate size of the work cloth that corresponds to the mounted embroidery frame in terms of specific numerical values. Therefore, based on the specific numerical values that are displayed on the LCD 315, the user is able to measure the dimensions of a work cloth and cut the work cloth to the appropriate size.

Modified Examples

The present disclosure is not limited to the embodiments that are described above, and various types of modifications can be implemented within the scope of the present disclosure.

Figure 12:
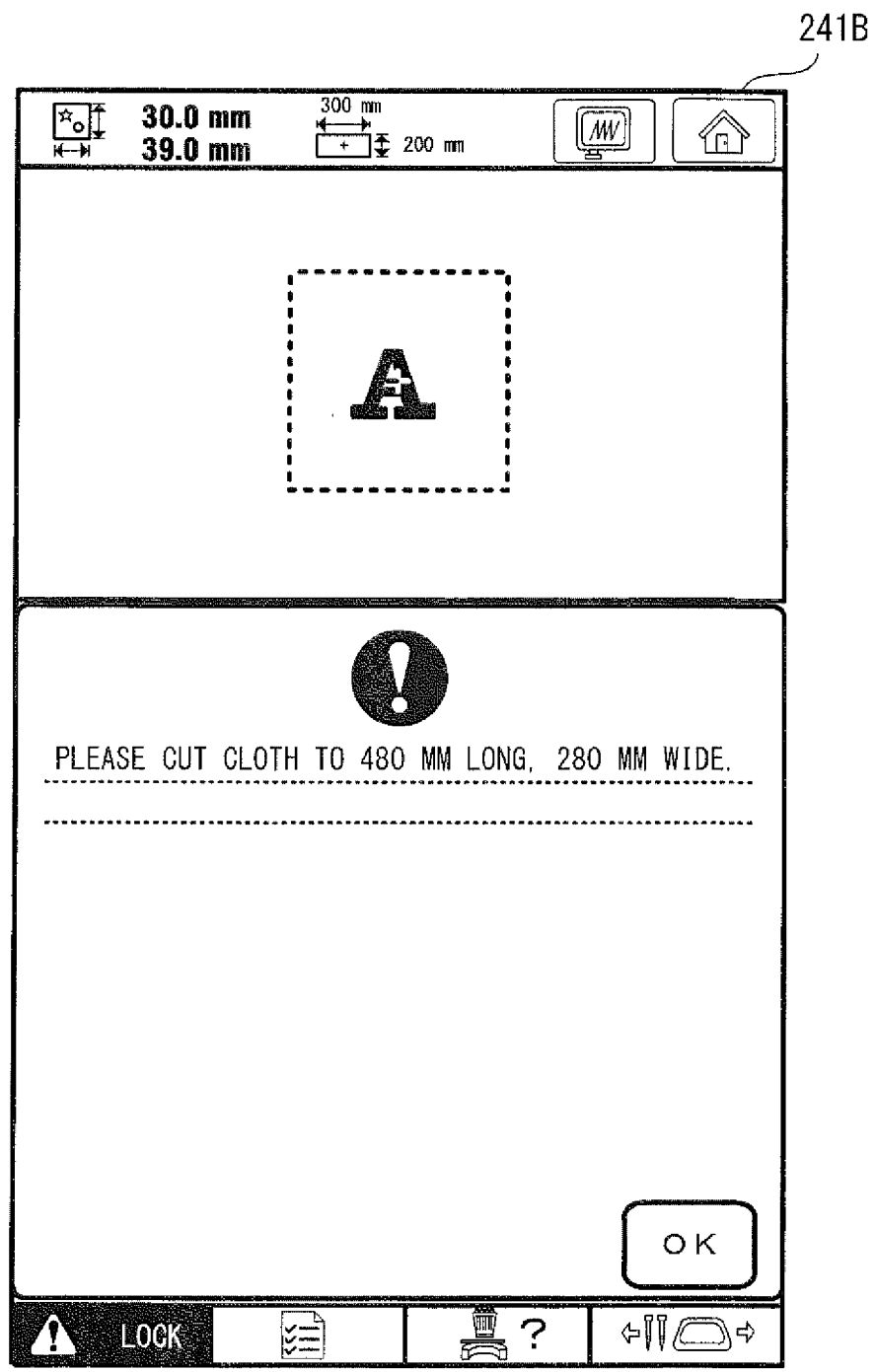
FIG. 12 is a modified example of a dimension display screen on which a size of a work cloth 300 is displayed.

In the embodiments that are described above, the CPU 61 causes the LCD 315 to display, as the dimension display image 241, an image of one embroidery frame, an image of the work cloth that corresponds to that embroidery frame, the dimensions of that work cloth, and the dimensions of the sewing-enabled area EA. However, the CPU 61 may also display a dimension display image 241B that shows only the dimensions of the work cloth that corresponds to the embroidery frame, as shown in FIG. 12. Specifically, from the ROM 62, the CPU 61 reads, from the dimension data table 230 that is shown in FIG. 6, "480 mm×280 mm," which are the dimensions of the work cloth that corresponds to the extra large frame, then displays the work cloth size that it has read on the LCD 315.

Clamping Frame 219

In the embodiments that are described above, the embroidery frame has a structure in which the work cloth is clamped by the inner frame 92 and the outer frame 91. However, the embroidery frame may also be a clamping frame 219.

Figure 13:
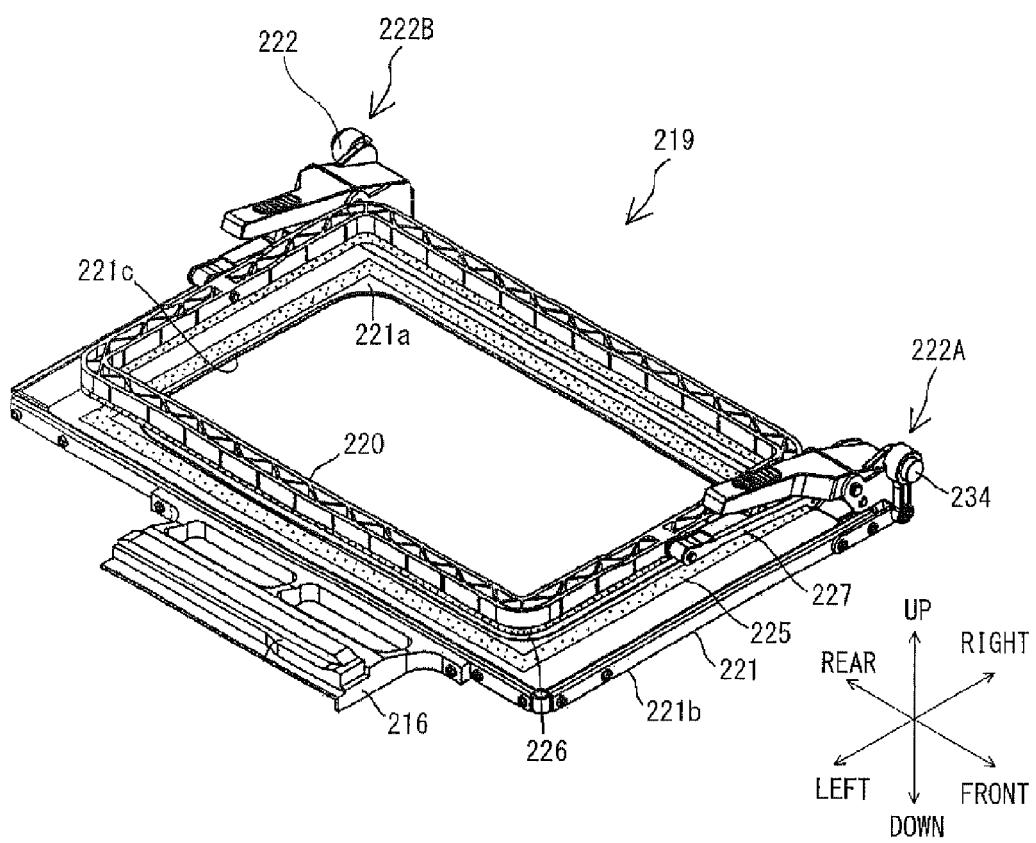
FIG. 13 is an oblique view of an entire clamping frame 219.

The clamping frame 219 will be explained in detail with reference to FIG. 13. The clamping frame 219 is provided with an upper frame 220, a lower frame 221, and a clamping mechanism 222. The clamping frame 219 clamps and holds the work cloth by using the clamping mechanism 222 to press the upper frame 220 down against the lower frame 221.

The lower frame 221 is configured such that a rectangular holding plate portion 221a that holds the work cloth from below and an outer circumferential portion 221b that encircles the outer circumference of the holding plate portion 221a form a single unit. A rectangular opening 221c is formed in the central portion of the holding plate portion 221a. An embroidery sewing-enabled area is defined inside the opening 221c. A tape 225 that prevents the work cloth from shifting is affixed to the top face of the holding plate portion 221a, which faces the upper frame 220. A mounting portion 216 for mounting the clamping frame 219 onto the carriage 30 of the embroidery frame moving device 332 is affixed to the left edge of the lower frame 221.

The upper frame 220 is formed in a rectangular shape in a plan view. A tape 226 that prevents the work cloth from shifting is affixed to the bottom face of the upper frame 220. The upper frame 220 is coupled to the left end of each one of a front-and-rear pair of coupling members 227 on the clamping mechanism 222, such that the upper frame 220 can rotate. The upper frame 220 is configured such that it can pivot between a holding position and a released position. The holding position is a position in which the upper frame 220 presses the work cloth down onto the lower frame 221. The released position is a position in which the upper frame 220, by separating from the lower frame 221, releases the work cloth that was pressed.

The clamping mechanism 222 includes a front-and-rear pair of clamping mechanisms 222A, 222B. The clamping mechanisms 222A, 222B have symmetrical structures front-and-rear, so only the clamping mechanism 222A on the front side will be explained. The clamping mechanism 222A includes the coupling member 227, a locking mechanism, and a lock release button 234. The coupling member 227 extends from right to left along the front side of the upper frame 220. The locking mechanism locks the upper frame 220 in the holding position, where it presses down on the work cloth. The lock release button 234 releases the upper frame 220 from the locked state. When the user operates the lock release button 234 by pressing it, the lock is released, the coupling member 227 rises, and the upper frame 220 is switched from the holding position, where it presses down on the work cloth, to the released position.

The dimensions of the work cloth that corresponds to the clamping frame 219 will be explained. The dimensions of the work cloth that corresponds to the clamping frame 219 are values that are greater than those of the sewing-enabled area EA of the clamping frame 219 by a specified margin. The size of the specified margin is equivalent to the length of the portions of the work cloth that is clamped between the bottom face of the upper frame 220 and the top face of the lower frame 221. Specifically, the size of the specified margin is equal to the width of the tape 226 on the bottom face of the upper frame 220.

In the embodiments that are described above, the sewing machine 301 has only one needle bar, but it may also be a multi-needle sewing machine that has a plurality of needle bars.

In the first embodiment, in a case where the user has designated the embroidery frame, the CPU 61 causes the LCD 315 to display the size of the work cloth that corresponds to the designated embroidery frame. In the second embodiment, in a case where the user has designated the embroidery pattern, the CPU 61 causes the LCD 315 to display the size of the work cloth that corresponds to the designated embroidery pattern. In the third embodiment, in a case where the embroidery frame has been mounted in the sewing machine 301, the CPU 61 causes the LCD 315 to display the size of the work cloth that corresponds to the mounted embroidery frame. However, the timing of the display of the size of the work cloth that corresponds to the embroidery frame is not limited to the methods that are described above. For example, in a case where the user has used a finger to operate the touch panel 326, a list that shows the sizes of the work cloths, like that shown in FIG. 6, may also be displayed on the LCD 315. Additional methods other than this one may also be used, as long as the sizes of the work cloths are displayed.

In the embodiments that are described above, the portion that reads, from the ROM 62, the size of the work cloth that corresponds to the type of the embroidery frame is implemented in the form of software that the CPU 61 extracts, but it may also be implemented in the form of hardware. Furthermore, in the embodiments that are described above, examples were shown in which the CPU 61 performed every step, but configurations are also acceptable in which at least some of the steps are performed by a different CPU or in which the steps are performed by one or a plurality of ASICs.

What is claimed is:

1. A sewing machine comprising:
   a carriage on which a plurality of types of an embroidery frame is configured to be removably mounted, the embroidery frame being capable of holding a work cloth, the carriage being capable of moving the embroidery frame parallel to two intersecting axes;
   a storage portion that is configured to store a plurality of sizes of the work cloth that respectively correspond to the plurality of types of the embroidery frame;
   a display portion that is configured to display information relating to at least sewing; and
   a control device that is configured to read, from the storage portion, the sizes of the work cloth that respectively correspond to the types of the embroidery frame and to cause the display portion to display the sizes of the work cloth that have been read.

2. The sewing machine according to claim 1, wherein the control device causes the display portion to display the sizes of the work cloth in the form of dimensions of the work cloth, the work cloth occupying a plane through which the two axes extend, and the work cloth having edges that are parallel to each of the two axes.

3. The sewing machine according to claim 2, wherein the control device also causes the display portion to display at least a portion of an image of the embroidery frame and an image of the work cloth of the size that corresponds to the type of the embroidery frame.

4. The sewing machine according to claim 2, wherein the dimensions of the work cloth that corresponds to each type of the embroidery frame are values that are computed by adding specified dimensions to dimensions of a sewing-enabled area that corresponds to that type of the embroidery frame.

5. The sewing machine according to claim 4, wherein the embroidery frame includes an inner frame and an outer frame, and is configured to hold the work cloth by clamping the work cloth between an outer circumferential face of the inner frame and an inner circumferential face of the outer frame, and
   the specified dimensions include a first length and a second length, the first length being the sum of the distance from the outer circumferential face of the inner frame to an inner edge of the inner frame and the distance from the inner circumferential face of the outer frame to an outer edge of the outer frame, and the second length being the length, in a direction that is orthogonal to the plane that the work cloth occupies, of a portion where the outer circumferential face of the inner frame and the inner circumferential face of the outer frame are opposite one another.

6. The sewing machine according to claim 1, wherein the control device accepts a designation of the type of the embroidery frame and reads, from the storage portion, the size of the work cloth that corresponds to the type of the embroidery frame that has been designated.

7. The sewing machine according to claim 1, wherein the control device accepts a designation of an embroidery pattern, determines whether the size of a sewing-enabled area that corresponds to the embroidery frame is not smaller than the size of the designated embroidery pattern, and in a case where the size of the sewing-enabled area that corresponds to the embroidery frame is not smaller than the size of the designated embroidery pattern, reads, from the storage portion, the size of the work cloth that corresponds to the type of the embroidery frame for which the corresponding sewing-enabled area has been determined to be not smaller than the size of the designated embroidery pattern.

8. The sewing machine according to claim 1, further comprising:
   a detection portion that is configured to detect a shape of a detected portion of the embroidery frame that is mounted on the carriage, the shape of the detected portion being different for each type of the embroidery frame, wherein
   the control device reads, from the storage portion, the size of the work cloth that corresponds to the type of the embroidery frame, based on a result of the detection by the detection portion.

9. The sewing machine according to claim 3, wherein the control device also causes the display portion to display an image of a sewing-enabled area that corresponds to the type of the embroidery frame.

10. A non-transitory computer-readable medium storing a control program that is executable on a sewing machine that includes a display portion and a storage portion in which are stored a plurality of sizes of a work cloth that respectively correspond to a plurality of types of an embroidery frame, the program comprising computer-readable instructions that, when executed, cause the sewing machine to perform the steps of:
   reading, from the storage portion, the sizes of the work cloth that respectively correspond to the types of the embroidery frame; and
   displaying, on the display portion, the sizes of the work cloth that have been read.

* * * * *